July 11, 1933.     B. L. SIMMONS     1,917,333
WHEEL HOE
Filed Aug. 1, 1931
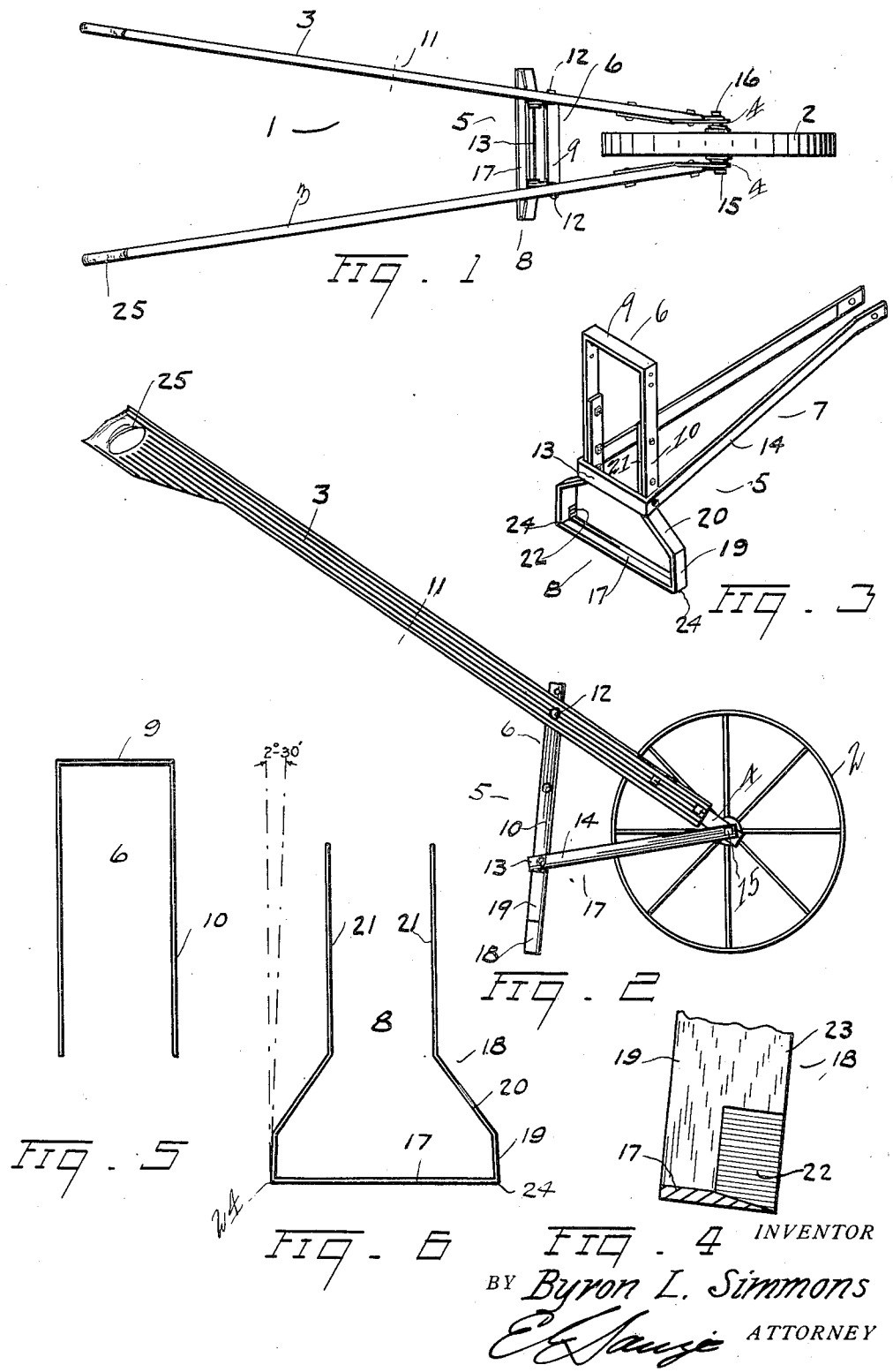
INVENTOR
BY Byron L. Simmons
ATTORNEY Patented July 11, 1933

1,917,333

UNITED STATES PATENT OFFICE

BYRON L. SIMMONS, OF FREEWATER, OREGON

WHEEL HOE

Application filed August 1, 1931. Serial No. 554,417.

This invention relates to wheeled hoes and has as one of its objects to provide an implement that is extremely light in weight and that is rigid at necessary points and that is yielding and flexible where it will relieve strain.

Another object of the invention is to provide a wheeled hoe whose parts and whose assembly provide for increased efficiency with decreased labor.

A further object of the invention is to provide a wheeled hoe that by its distribution of weight and parts provides an implement adapted to operate in close quarters, and by the thinness of its material may be effectually operated by a backward movement under adverse conditions.

A further object of the invention is to provide a wheeled hoe that is adapted to work close to a plant and providing a protector therefore for the purpose.

A further object of the invention is to provide a wheeled hoe that is exceptionally cheap to construct.

With these and other objects in view reference is now had to the accompanying drawing, in which:

Fig. 1 is a plan view of the assembled device;

Fig. 2 is a side elevation thereof;

Fig. 3 is a perspective view of the frame structure;

Fig. 4 shows the cutting tool in cross section and a fragment of the stalk offset and plant protector;

Fig. 5 is a front elevation of the arch member; and,

Fig. 6 is a front elevation of the tool member.

Having reference to the drawing like numerals refer to like parts throughout the several views and the numeral 1 refers to the wheeled hoe as a whole which consists of a light weight wheel 2 in which is contained the usual bushing (not shown) through which is passed a bolt like axle whose ends project on either side thereof, for a purpose to be explained.

Mounted on this axle is a pair of handles 3 each handle consisting preferably of a slightly yielding piece of wood having attached to its lower end a slightly flexible strip 4 adapted to engage the axle for rigid securement thereto and to provide certain flexible qualities between the axle and the handle, and the handles are secured to this axle in a manner to be explained.

Attached to the wheeled hoe 1 is a self braced frame structure 5, preferably consisting of three parts, to be described, and the respective parts of this structure are formed of light, thin, narrow strips of material, preferably of steel, whereby lightness and flexibility will prevail, with the parts being strengthened at the proper places by reinforcing and by triangular braces formed mainly by the parts themselves, and in cooperation with the handles of the implement, in a manner to be explained as the description of the several parts proceeds.

Before proceeding with a description of the various parts and their assembly let it here be known that the presence of other implements of this nature is recognized and that the invention herein is intended to and by trial does provide a more efficient and less expensive implement in the field by the construction and arrangement of its parts rather than by a radical departure from the article.

Having this in mind then the three parts consist of an arch member 6, a U-shaped brace 7, and a tool member 8 and these will now be explained:

The arch member 6 consists of a continuous thin narrow strip formed to an inverted U shape, thus providing a top lateral member 9, and two depending legs 10 attached to or formed in connection with the respective ends of the lateral 9.

This lateral 9 is of longitudinal dimensions necessary to spread the diverging handles 3 at their outer ends when secured therebetween to permit free ingress of the operator therebetween, for a purpose to be explained, and for the purpose of spreading the handles the lateral 9 is placed between the handles at a proper point between the mid-point of said handles (shown as at 11) and the wheel 2 of the device where it is secured by a bolt, the heads 12 only of which are shown. By this means a spacer is provided that forms a brace with the said bolt and this spacer and the lower ends of the handles provide a substantially triangular braced structure that will secure the arch member rigidly in place and maintain the proper spread of the handles.

The depending legs 10 are now secured rigidly in a fixed position by means of the U-shaped brace 7 which is rigidly attached thereto and which consists of a lateral member 13, termed an intermediate lateral as this member is located between the top lateral and a bottom lateral, to be described.

This intermediate lateral 13 is also provided with legs 14 which are extended forward and secured to the axle by means of the aforesaid bolt and a nut 15 threadedly engaging the bolt, the nut and head 16 of the bolt acting to secure the respective handles in addition to these legs 14, upon the axle. By this arrangement of the parts the intermediate lateral 13 and the legs 14 form a substantially triangular braced structure for the frame structure to prevent a twisting movement of the depending legs 10, or a rocking movement of the structure on the bolt securing the top lateral 9 to the handles, and in addition and as the lateral 13 is positioned below the plane of the handles, these extending legs 14 together with the depending legs 10 and the said handles 3 form a pair of triangular side braces which rigidly maintain the longitudinal position of the respective legs 10 of the arch and render these light legs sufficiently strong to support the tool member during operation.

The tool member 8 is preferably removably attached to said arch member 6 as shown and consists of a horizontally positioned cutting tool 17 disposed to provide a bottom lateral brace for the arch member 6, and is substantially of the form of a U, the legs 18 thereof, however, being shaped to provide an inwardly inclined vertical 19 forming a stalk offset, and with a second inclined bend providing a foliage offset 20, and having continued extensions 21 disposed to parallel the declined legs 10 of the arch member 6 and when secured thereto to provide a reinforcing therefor if desired still permitting a certain yielding effect to the blade.

The cutting tool 17 is sharpened preferably as shown in Fig. 4 and the inwardly inclined vertical 19 is bent at right angles thereto and is likewise sharpened, as at 22, to correspond with the cutting tool 17 and this sharpened portion 22 of the vertical is discontinued substantially as shown and provides a blunt (or unsharpened) upper portion 23, thereby forming with its inclination of practically two and one half degrees, and its blunt edge 23, a plant protector.

By this means the slight inclination of the vertical normally bears the upper part of the plant protector away from the stalk and the blunt edge further augments the protection and yet permits the substantially right angled corner 24 of the cutting tool 17 to cut weeds adjacent to the plant without danger, and the second or foliage offset 20 permits the tool to pass under the foliage without affecting that part of the plant.

While my preferred form of frame structure consists of three parts it is obvious that the arch member 6 and the tool member 8 may be made integral, where no reinforcing is demanded, thereby again simplifying construction.

In construction the top lateral 9 is preferably positioned substantially centrally between the said mid-point 11 and the wheel axle, in other words close to the rim of the wheel 2, as by this arrangement the height of the grips 25 of the handles may be obtained with a relatively short frame structure, and by providing a slight rearward inclination to the vertical structure 21 a pitch or draft is given to the cutting tool which tends to draw the blade into the ground during operation, and as the angle of the draft changes with the height of the grips (caused by its movement about the axis of the wheel) the blade cannot be drawn into the ground to a depth that would break the frame structure.

In use the grips 25 of the implement are preferably brought to the height of the hands of the operator with the arms hanging and with the blade in the ground the proper depth, and the device is operated by swinging the hands to and fro in the usual manner but preferably at the sides of the operator.

At each cut the operator moves forward and soon passes down the row. In overhanging foliage that would extend across the path of the hoe 1 the operator may advance between the handles and remove the object without having to remove the implement out of the way for the purpose. By the lightness of the implement and the position of the frame structure with respect to the wheel, i. e., at a point to balance or support the hoe erect when standing unattended, the tool may be brought to the opposite side of the plant if necessary, by a twist of the handles which will throw the tool to one side, a lesser twist placing the tool in position to remove weeds before a plant, and the same twist and a backward movement (using the dull side of the thin blade) cutting weeds ahead of the plant, and without unduly affecting the foliage due to the foliage offset thus effectually operating on all sides of the plant.

As will be noted in Fig. 2 the plant protector is of the same inclination as the frame structure and hence the upper or dull part of the vertical would strike the plant first, to give the alarm by the shaken plant and without damage thereto, when with a slight lateral, or longitudinal, movement of the handles the close-by weed may be removed.

Having thus described my invention, I claim:

1. In a wheeled hoe, the combination with a wheel mounted on an axle, and a pair of handles mounteed on and diverging from said axle, of a braced frame structure formed of thin narrow strips and comprising a vertically positioned arch member disposed relative to said handles to provide a lateral brace therefor and to permit free ingress between said handles to said arch member, a U-shaped member attached by the open end to said axle and at the closed end to the arch member to provide in conjunction with said handles a triangular braced structure, and a substantially U-shaped tool member removably attached to said arch member comprising a flat cutting blade disposed to provide a bottom lateral brace for said arch member, the lower portion of the arms of said U-shaped tool member being offset to provide plant protectors.

2. In a wheeled hoe, the combination with a wheel mounted on an axle, and a pair of handles mounted on and diverging from said axle, of a braced frame structure formed of thin narrow strips and comprising a vertically positioned arch member, of inverted U-shape, said arch member being disposed to provide a top lateral brace and depending legs, said brace providing a spacer between said handles disposed between the mid-point thereof and the wheel to permit free ingress between said handles to said brace, a U-shaped member attached by the open end to said axle and at the closed end to the depending legs of the arch member, and providing an intermediate brace therefore, the arms of the open end and the depending legs forming in conjunction with the handles a triangular braced structure, and a substantially U-shaped tool member removably attached to said arch member and providing a flat cutting blade disposed to form a bottom lateral brace therefore.

3. In a wheeled hoe, the combination with a wheel mounted on an axle, and a pair of handles mounted on and diverging from said axle, of a three part braced frame structure formed of thin narrow strips and comprising a vertically positioned arch member disposed to provide a top lateral brace having depending legs, said top lateral brace forming a spacer adjustably secured between said handles and positioned between the mid-point thereof and the wheel, and disposed to permit free ingress between said handles to said brace, a U-shaped member providing at its closed end an intermediate lateral brace secured to the depending legs of the arch member and by its forwardly extending legs attached to said axle, said forwardly extending legs providing in conjunction with said handles and said depending legs a triangular braced structure, and a substantially U-shaped tool member comprising a horizontally disposed sharpened cutting blade attached to and providing a bottom lateral brace for said arch member, and providing upwardly extending parallel portions of the legs disposed to reinforce said depending legs and downwardly divergent portions to provide stalk offsets and foliage offsets, said stalk offsets being sharpened to correspond with the cutting blade at their juncture therewith and provided with blunt upper portions to form with their inclination plant protectors.

In testimony whereof I affix my signature.

BYRON L. SIMMONS.